No. 754,478. PATENTED MAR. 15, 1904.
J. B. MILLER.
GARMENT STRETCHER.
APPLICATION FILED MAR. 18, 1903.
NO MODEL.

WITNESSES:
Edwin C. Dozier.
Herbert R. Marlatt.

J. B. MILLER.
INVENTOR.
BY Robert W. Randall
ATTORNEY.

No. 754,478. Patented March 15, 1904.

UNITED STATES PATENT OFFICE.

JOSEPH B. MILLER, OF SEDALIA, MISSOURI.

GARMENT-STRETCHER.

SPECIFICATION forming part of Letters Patent No. 754,478, dated March 15, 1904.

Application filed March 18, 1903. Serial No. 148,316. (No model.)

*To all whom it may concern:*

Be it known that I, JOSEPH B. MILLER, a citizen of the United States, residing in the city of Sedalia, in the county of Pettis and State of Missouri, have invented new and useful Improvements in Textile-Stretchers, of which the following is a specification, which is sufficiently clear and concise as to enable others skilled in the art to which it appertains to make and use the same.

My present invention relates to improvements in stretchers, and more particularly to that class of stretchers designed for stretching articles of apparel—such, for instance, as trousers and the like—and, in fine, for curing inadequacies which may have occurred by reason of usage thereof and to renew the appearance of trousers or the like and put them in a more presentable condition.

Other objects of my invention are to provide a trousers-stretcher which will be simple in character, strong and durable in construction, easily operated and maintained, composed of a minimum of mechanical parts with a maximum of efficiency, and capable of a wide scope of usefulness; and still another object is to provide an improved article of manufacture which can be manufactured and sold at a comparatively low price.

Other objects and advantages of my invention will appear from the following specification, the claims hereunto appended, and the accompanying drawings, forming a part thereof.

For a more thorough and comprehensive understanding of my invention reference is had to the accompanying drawings, in which—

Figure 1:
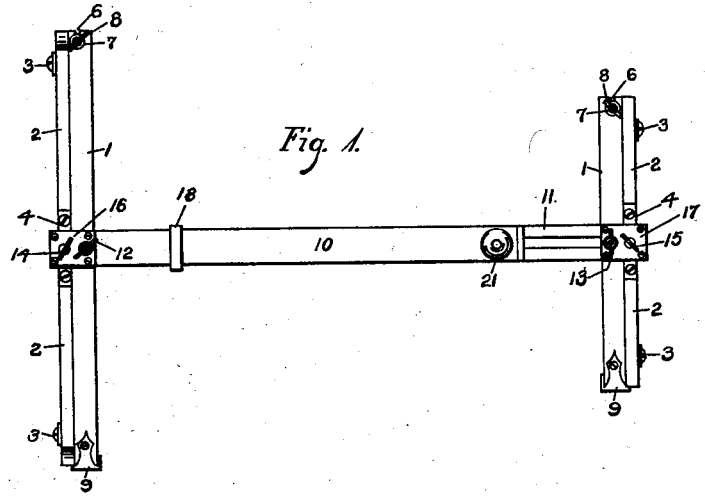
Figure 2:
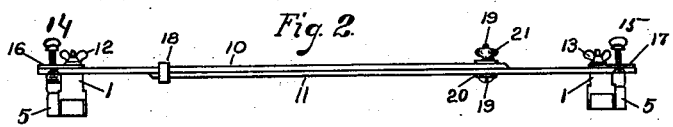
Figure 3:
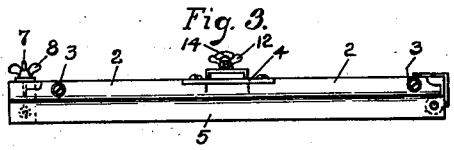
Figure 4:
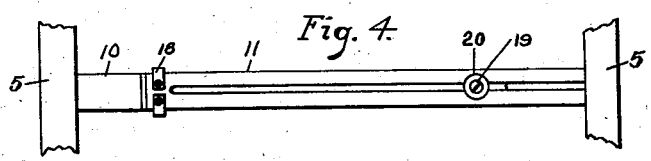

Figure 1 is a plan view of the upper surface of my entire invention. Fig. 2 is a central longitudinal section of my invention. Fig. 3 is an end elevation of my invention, and Fig. 4 is a detail view of the under side of the central portion thereof.

Similar indices refer to and denote like parts throughout the several views.

Referring now to the drawings, I will describe the invention in detail as briefly and compactly as I may.

My invention contemplates, primarily, the use of two clamping members of identical construction, except that one should be longer than the other, especially when constructed for stretching trousers or the like. The clamping members are united by arms, one of which extends inward centrally from each clamping member and at right angles thereto, and said arms are adapted to overlap each other and to be secured together at points desired, as will hereinafter appear. Said clamping members each consist of a body-bar 1, secured in their centers to the ends of the arms 10 and 11 by the thumb-screws 12 and 13. Secured to the outer faces of the bars 1 are auxiliary bars 2, said bars 2 being secured to the bars 1 at each end by the screws 3, as shown in Figs. 1 and 3. The bars 2 are each in two parts, with the parts separated in the center and connected by a flexible plate 4, as shown in Fig. 3, by which it is apparent that the inner ends of the bars 2 may be slightly raised and lowered, the screws 3 acting as pivots therefor. The inner lower corners of the bars 2 are rounded, as shown in Fig. 3. From the above description it will be seen that the bars 2 are formed flexible vertically and at the same time held in slidable contact with the faces of the bar 1 by the screws 3, as shown in Fig. 1. Below the bars 1 and the bars 2 are the clamp members 5, each of which is of a size substantially the same as the combined size of the bars 1 and 2, against the under side of which they are adapted to contact, as shown in Fig. 3. Into one end of the members 1 and 5 are cut corresponding vertical slots 6, and in said slot in the member 5 is pivoted a bolt 7, which is adapted to turn outwardly from and out of the slot in the member 1, and thumb-screws 8 are threaded onto the free ends of said bolts. On the opposite ends of the members 1 and 5 is a hinge 9, by which the members 1 and 5 are pivotally united at that end, while at the other end they may be secured together by the bolt 7 and the thumb-nut 8, as shown. The spacing-arms (represented by numerals 10 and 11) extend inward, the former from the longer clamp and the latter from the shorter clamp, as shown. One end of each of said arms is adapted to be secured to its respective member by the thumb-screws 12 and 13. Through the extreme ends of the arms 10 and 11 are other thumb-screws 14 and 15, whose points are adapted to contact with the center of the upper surface of the plates 4 in order that by tightening the thumb-screws 14 and 15 the inner ends of the bars 2 will be clamped against the garment, as above referred to. The outer ends of the upper surface of said arms 10 and 11 are provided with escutcheons 16 and 17, through which said thumb-screws operate, forming bearings therefor. The arm 11 has a slot formed centrally and longitudinally thereof along almost its entire length, and on the outer end of said arm 11 is secured a loop member 18 therearound, providing a space on the upper side of the arm 11, through which the arm 10 may slide back and forth and be kept in contact therewith.

The numeral 19 represents a bolt passing through the inner end of the arm 10 and through the slot in the arm 11, with a washer 20 on its lower end, secured by the head of the bolt, which washer is adapted to slide along on the under face of the arm 11. The upwardly-projecting end of the bolt 19 is threaded and carries a knob 21, adapted to contact with the upper face of the arm 10.

It will now be apparent that the thumb-screws 14 and 15 may be loosened, which will allow the auxiliary bars 2 to lay parallel with the bars 1; but by turning the thumb-screws 14 and 15 the points of said screws will engage the top of the plates 4, and as said screws are turned down the flexible bars 2 will be bowed downward, causing the lower inner points of the bars 2 to tightly engage the members 5.

Operation: Supposing the device in the position shown in Fig. 1, the operation is as follows: The thumb-nuts 8 are loosened and the bolts 7 turned outward, allowing the clamps 5 to turn down and back on their hinges at the opposite ends. The legs of the trousers to be stretched should then be folded together, with the seams on top of each other at the edges. Place the bottom or lower ends of the trousers between the members of the short clamp above the hems and the crotch of the trousers between the members of the long clamp. Then bring the clamping members 5 up against the goods, bringing the bolts 7 upright in the slots 6 and screw down the thumb-nuts 8. The thumb-screws 14 and 15 are then screwed down tightly, which causes the inner rounded points of the members 2 to clamp the center portions of the trousers. The two clamping members are then pulled apart as far as possible, thus stretching the legs of the trousers, and the knob 21 is then tightly run down against the arm 10, which will hold the members in that position. The goods may then be dampened and ironed or pressed, if desired, and again stretched and secured, and they may then be hung up for the goods to dry and set in that position.

From the above description, taken in connection with the accompanying drawings, it will be apparent that I have produced an improved stretcher embodying the objects otherwheres referred to in this specification.

While I have illustrated and described the best means to me known at this time for carrying out the objects of my invention, I wish it to be understood that I do not restrict myself to the exact details of construction shown and described, but hold that any slight changes or variations in such details as would suggest themselves to the ordinary mechanic would clearly fall within the limit and scope of my invention.

Having now fully shown and described my invention and its application, what I claim, and desire to secure by Letters Patent of the United States, is—

1. In a garment-stretcher, the combination of a pair of contacting arms overlapping each other and adapted to be adjustably secured together, the outer end of each arm carrying a clamping member, said clamping members being identical in construction but of different lengths and consisting of a body-bar to which said arms are secured by thumb-screws, an auxiliary two-part bar attached to the outer side of said body-bars, its parts connected by a flexible plate, thumb-screws extending down from the arms adapted to contact with said plate, a main clamping member hinged below and to said body member, and means for locking the clamping members in engagement with the respective body member, substantially as shown and described.

2. In a garment-stretcher the combination of a pair of main clamping members, arms extending inward from each of the clamping members, means for securing the arms together adjustably, an auxiliary clamp attached to the outside of each of the clamps—consisting of two parts united by a plate, screws extending down from the outer ends of said arms adapted to contact with said plate, and means for locking the parts of the clamp together, all substantially as shown and described and for the purposes set forth.

3. A garment-stretcher having in combination a pair of oppositely-disposed clamps connected adjustably by arms, auxiliary clamps attached to said main clamps adapted to clamp the goods between the outer ends of the main clamps, substantially as described.

In testimony whereof I have hereunto signed my name to this specification in the presence of two subscribing witnesses.

JOSEPH B. MILLER.

Witnesses:
T. C. HOLLAND,
L. F. LOVELACE.